United States Patent

[11] 3,564,312

[72] Inventor Victor Bunea
Bucharest, Romania
[21] Appl. No. 804,330
[22] Filed Oct. 18, 1968
[45] Patented Feb. 16, 1971
[73] Assignee Uzina De Masini Electrice Bucaresti
Bucharest, Romania
[32] Priority Oct. 18, 1967
[33] Romania
[31] 54,899

[54] MEDIUM FREQUENCY INDUCTOR GENERATORS
6 Claims, 9 Drawing Figs.
[52] U.S. Cl. ............................................. 310/168
[51] Int. Cl. ........................................... H02k 19/24
[50] Field of Search .................................. 310/166,
157, 168, 163, 186, 171, 169, 170, 214; 322/47

[56] References Cited
UNITED STATES PATENTS

| | | | |
|---|---|---|---|
| 2,054,678 | 9/1936 | Merrill | 310/169 |
| 2,431,223 | 11/1947 | Ball | 310/169 |
| 2,648,021 | 8/1953 | Kaczor | 310/168 |
| 2,769,953 | 11/1956 | Schwan | 310/168 |
| 2,827,582 | 3/1958 | Krebs | 310/168 |
| 3,157,810 | 11/1964 | Adkins | 310/168 |
| 3,391,294 | 7/1968 | Moxie | 310/214 |
| 3,393,335 | 7/1968 | Pletenik | 310/214 |

*Primary Examiner*—W. E. Ray
*Assistant Examiner*—R. Skudy
*Attorney*—Spencer & Kaye

ABSTRACT: The operating characteristics of a medium-frequency generator of the inductor-alternator type are improved without requiring the use of a series condenser for load compensation by constructing a generator so that it includes at least the first two and preferably all of the following structural features:

1. the number of armature coils in the armature winding of the generator is such that when the generator is operating under open circuit conditions, the maximum output voltage is at most equal to the nominal or rated output voltage;

2. the width of the permeance teeth on both the stator and the rotor is equal to from $0.25t$ to $0.4t$, where $t$ is the pitch of the slots separating the teeth, i.e. the peripheral spacing of a point on one tooth from the corresponding point on the adjacent tooth;

3. the permeance teeth are given a profile whereby the width thereof is constant for a height which is less than the width and then rapidly increases for the remainder of the total height; and 4. the armature winding conductors, which are mounted in slots distributed about the periphery of the stator are positioned as close to the air gap as possible in order to reduce the leakage reactance of the armature winding.

PATENTED FEB 16 1971 3,564,312

INVENTOR
Victor Bunea

BY Spencer & Kaye
ATTORNEYS.

MEDIUM FREQUENCY INDUCTOR GENERATORS

BACKGROUND OF THE INVENTION

This invention relates to medium-frequency generators, 2,000—10,000 Hz and higher, of the inductor-alternator type, e.g. of the Guy-type or analogous, and in particular to an improved construction thereof in order to increase their specific active or real power, power factor and efficiency characteristics and their safety during use.

Generators of this type, especially for higher frequencies, have the drawbacks that they cannot be loaded to their thermal capacity and, when under load, have relatively large iron losses. Additionally, the operating safety of such generators is decreased by the fact that they generally require series capacitance compensation of the load circuit.

It is accordingly a primary object of this invention to provide an inductor-alternator of the Guy or analogous type which overcomes the problems of the prior art.

More particularly, is an object of this invention to provide a generator of the inductor-alternator type having increased efficiency and power factor without requiring the use of series load capacitance compensation.

BRIEF SUMMARY OF THE INVENTION

According to the present invention the above and other objects are achieved by constructing the inductor-alternator so that the permeance teeth formed on the periphery of the stator and the rotor have a peripheral width $d$ equal to from $0.25t$ to $0.4t$, where this the pitch of the slots separating the teeth, and the number of coils of the armature winding, which is mounted within a number of slots formed in the periphery of the stator, is such that the maximum output voltage of the generator when it is operating under idling or open-circuit conditions is at most equal to the nominal voltage. Additionally, the generator is preferably also constructed so that the permeance teeth have a profile wherein the tip portion is of constant width for a height which is less than the width thereof and then rapidly increases for the remainder of their total height, and so that the conductors of the armature winding are mounted as close to the generator air gap as possible, even to the extent of risking deterioration of the profile of the permeance teeth defining the edges of the slots in which the armature winding is mounted.

DESCRIPTION OF THE PREFERRED EMBODIMENTS

Figure 1:
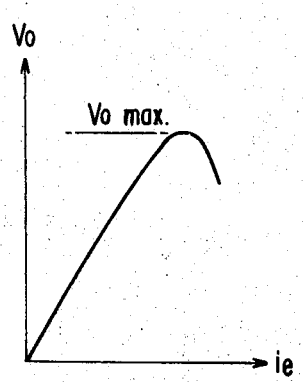
FIG. 1 is a graph showing the relationship of the voltage $V_0$ to the exciting current, $i_e$, under open circuit conditions in a Guy-type generator.
Figure 2:
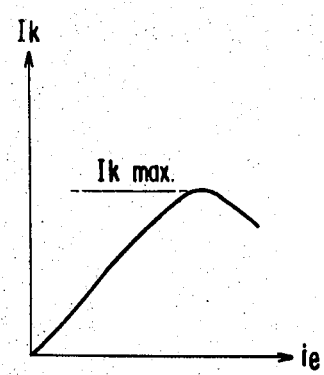
FIG. 2 is a graph showing the relationship of the current $I_k$ in a short-circuited winding to the exciting current $i_e$ of a generator of this class.
Figure 3:
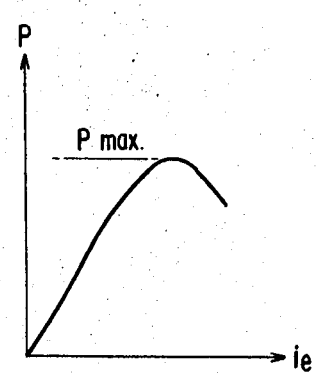
FIG. 3 is a graph showing the relationship of the power P to the exciting current $i_e$ in a generator of this type.

FIGS. 1—3 illustrate the functional characteristics of electric generators of the inductor-alternator type, e.g. the Guy-type or analogous. The open circuit characteristic, which is a graph of the output voltage $V_o$, related to the exciting current $i_e$ is shown in FIG. 1; the short circuit characteristic, i.e. the graph of the current $I_k$ in the short-circuited winding of the stator related to the exciting current $i_e$, is shown in FIG. 2; and the load characteristic, i.e. the active power P related to the exciting current $i_e$, is shown in FIG. 3. Each of these characteristics increases to a maximum and then begin to decrease with increasing field or exciting current. Accordingly, an increase in the exciting current above that corresponding to the maximum value is of no use, since instead of obtaining an increase in the generated power, a decrease in power is obtained.

Figure 4:
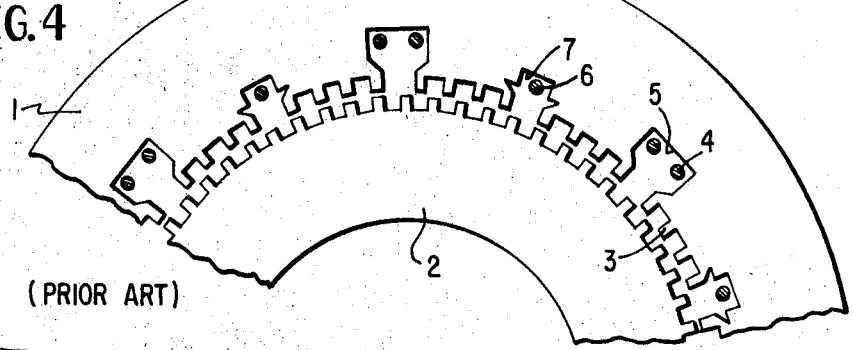
FIG. 4 is an end view, partially schematic of a portion of a generator of this type.

The construction of this type of generator is shown in FIG. 4, which represents schematically a portion of the end of the rotor and stator operatively mounted relative to one another to define an air gap therebetween. The stator 1, and the rotor 2, are formed from thin magnetic sheets provided with a plurality of peripheral slots. The rotor, which contains no windings, is provided with uniform slots which are distributed along the entire periphery thereof and which are separated by the teeth 3, called permeance teeth. The number Z of these teeth is dictated by the frequency $f$ of the desired generated current, according to the relation $Z=f/n$, where $n$ is speed of the rotor in revolutions per second.

The stator contains the exciting winding 4, mounted in a plurality of relatively large slots 5 distributed about the periphery thereof, and the armature winding 6 mounted in a plurality of smaller slots 7, intercalated between the slots 5. In the illustrated generator the armature winding slots 7 are midway between the exciting winding slots 5. Apart from these rather few slots, the stator 1 is also provided with a large number of small separate slots, separated by permeance teeth 3, having a similar profile to the rotor teeth. The teeth 3 are placed along the entire circular sector between the exciting winding slots 5 and the armature-winding slots 7. The distribution of the teeth 3 on the stator is such that when the permeance teeth of one sector of the stator are opposite to those of the rotor, the stator teeth of the adjacent sectors are opposite the slots of the rotor.

Figure 5:
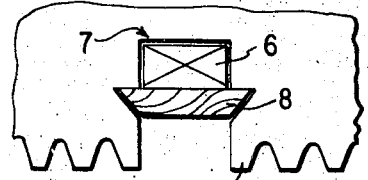
FIG. 5 is an enlarged end view, somewhat schematic, of a portion of the periphery of the stator of the generator shown in FIG. 4.

The exciting winding slots 5 and the armature-winding slots 7 are formed and arranged relative to the permeance teeth 3 so that the desired geometry of the permeance teeth 3 is maintained. Such an arrangement is shown in FIG. 5 in connection with an armature-winding slot 7. As seen in this FIG., in order to maintain the geometry of the permeance teeth 3 adjacent the slot 7, the conductors of the armature winding 6 are disposed at a rather large distance from the air gap, above the key 8, which in turn is placed at a distance from the air gap which is larger than the height of the permeance teeth 3.

Figure 7:
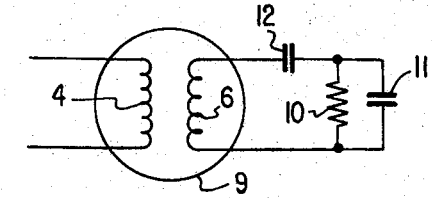
FIG. 7 is a schematic circuit diagram showing the load circuit of a generator according to the prior art.

Generators constructed in this general manner have the following disadvantages:

A low efficiency and power factor;

Reduced specific power; and,

A relatively small value (FIG. 3), for the peak power $P_{max}$ at which the machine can be loaded, requiring that the load impedance be compensated not only by capacitances connected across the load terminals, but also by capacitances connected in series with the armature winding in order to allow the generator to be utilized with higher power loads. A schematic diagram illustrating such a load impedance compensating circuit is shown in FIG. 7, wherein the reference numeral 9 represents the generator with the exciting winding 4 and the armature winding 6, and the load impedance 10 is compensated by the capacitance 11 connected in parallel to the load, and the capacitance 12 connected in series with the armature winding.

Due to the nature of the loads (heat treatment, melting, etc.) with which such generators are often utilized short circuiting thereof often occurs. In such cases the only load on the generator is the series capacitance resulting in harmful excess voltages for the machine as well as for the capacitance. Such a situation greatly reduces the safety of operation of such generators.

The above-mentioned disadvantages are more important when the generator is designed for a higher frequency (8000—10,000 Hz).

Figure 6:
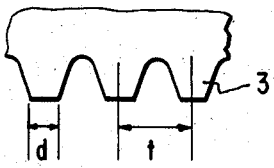
FIG. 6 is an enlarged view of a portion of FIG. 5.

Various methods of construction are known which try to remedy some of the above-mentioned disadvantages. For examples, in order to obtain higher peak valve, $V_{omax}$ (FIG. 1) for the open-circuit characteristic, it is recommended that the ratio between the width $d$ of the permeance teeth 3 and the slot pitch $t$ (FIG 6) be 0.4, regardless of the frequency of operation. Nevertheless, it is ascertained, that at higher frequencies, the peak valve $P_{max}$ of the load characteristic is still maintained at a relatively low value, so that the most important mentioned disadvantages are not eliminated.

It is also known that in order to avoid the disadvantages of connecting a capacitance in series with the armature winding, the load may be supercompounded by shunt capacitances and the generator may be operated with a capacitive reduced power factor (0.5—0.7). This method, which really avoids the use of the series capacitance, has the disadvantage that, for the same active power, the apparent power increases, so that increasing the dimensions of the generator becomes necessary. The losses and heating are also high when utilizing this expedient.

According to the invention the above-stated disadvantages are either eliminated or substantially reduced by modifying the structure of the generator so that it contains at least the first two and preferably all four of the following features:

1. Contrary to the current state of the art teaching of providing the generator with sufficient armature winding coils so that the maximum output voltage under open circuit conditions exceeds the nominal voltage, the number of coils for the armature winding and especially at higher frequencies, is reduced so that the maximum output voltage $V_{omax}$ is at most equal to the nominal voltage.

2. The ratio between the peripheral width $d$ of the permeance teeth 3 and the slot pitch $t$ is selected to be less than 0.4 and preferably between 0.25 and 0.4 depending on the frequency of operation of the generator. The higher the frequency of operation the smaller the ratio.

Figure 8:
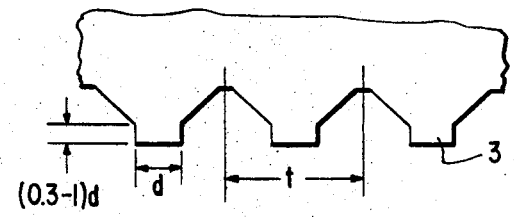
FIG. 8 is an enlarged view showing the preferred profile of the permeance teeth according to a feature of the present invention.

3. As shown in FIG. 8 the profile of the permeance teeth is modified to provide a new profile 3' such that the teeth have a tip portion with a substantially constant peripheral width $d$ for a relatively small height $h$ equal to from $0.3d—1.0d$, followed by a portion which rapidly increases in width for the remainder of the height of the teeth.

Figure 9:
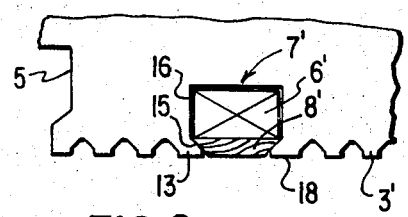
FIG. 9 is an enlarged view, somewhat schematic of a portion of the periphery of the stator of a generator illustrating the preferred manner of mounting the armature winding according to another feature of the invention.

4. The wires of the armature winding are positioned in the armature-winding slots of the stator so that they are as near as possible to the air gap in order to minimize the leakage reactance of the armature winding. Such a construction is shown in FIG. 9 wherein the conductors of the armatured winding are positioned close to the periphery of the stator, being separated from the air gap only by the thin key 8', which has a thickness approximately equal to or less than the height of the teeth 3'. In order to receive the key 8', the armature-winding slot 7' is also provided with a key-shaped portion 15 adjacent to the periphery of the stator formed by the triangular side portions 17 of the permeance teeth 13 adjacent the slot 7'. The slot 7' is also provided with a coil-carrying portion 16 formed behind the key-shaped portion for the reception of the armature winding 6'. The key 8' when inserted in the slot portion 15 holds the armature winding in place, with the bottom of the key occupying the same level as the outer edge of the tip portion 18 of the teeth. Due to the provision of the key-shaped portion 15 of the slot 7 and contrary to the prior art teachings, the permeance teeth 13 do not maintain their optimum form or profile nor the optimum ratio $d/t$. The disadvantage of reducing the voltage $V_{omax}$ caused by this deformation of the permeance teeth adjacent the armature-winding slots is accepted in order to gain the effect of the reduced leakage reactance.

The use of the constructive measures above described becomes more important as the frequency is increased. Although the operating characteristics are improved if only the first two constructive features or measures are used, to obtain optimum results desirably at least three of the four described constructive measures should be used.

As an example of a generator constructed according to the invention consider a 100 kw. generator operating at a synchronous frequency of 8000 Hz having a permeance tooth profile as shown in FIG. 8 and armature winding slots constructed as shown in FIG. 9.

The number of coils of the armature winding, calculated to obtain the voltage $V_{omax}$ ranges between 5 and 6 coils. Contrary to the normally accepted procedure, 6 coils should not be adopted in order to assure obtaining the nominal voltage, but rather only 5 coils should be used taking the risk of obtaining a reduced voltage at open-circuit.

The adopted tooth profile 3' corresponding to FIG. 8, has a constant width $d$, realized at a relative reduced height $h = (0.3–1.0)d$, and preferably $0.6\ d$ at 8000 Hz, followed as in FIG. 8 by a portion with a rapidly increasing width. Simultaneously with the adoption of this profile a ratio between the width $d$ of the tooth and the slot pitch, is utilized ranging between 0.25 and 0.4 which preferably is between 0.3 and 0.35 at 8000 Hz.

I claim:

1. An alternating-current generator of the inductor-alternator type comprising in combination: a wound stator and an unwound rotor mounted for rotation within said stator and forming an air gap therebetween; said stator having a plurality of field-winding slots, containing a direct current excited field winding, equally distributed about the periphery thereof facing said rotor and only one armature-winding slot located midway between each pair of field-winding slots and dividing the stator periphery therebetween into two equal sectors; each of said sectors having a plurality of equally spaced unwound slots on the periphery thereof facing said air gap, said unwound stator slots being respectively separated by permeance teeth of equal peripheral widths $d$, said width $d$, depending on the frequency of operation, being equal to from 0.25 to less than 0.4 times the pitch of said unwound stator slots; the entire periphery of said rotor being provided with equally spaced unwound slots separated by permeance teeth, said unwound rotor and stator slots being of substantially the same shape and having substantially the same angular pitch, and each of said rotor permeance teeth having a peripheral width $d$ which, depending on the frequency of operation, is equal to from 0.25 to less than 0.4 times the pitch of said rotor peripheral slots; said stator permeance teeth being arranged such that when the stator permeance teeth of one of said sectors are aligned with said rotor permeance teeth, the stator permeance teeth on the adjacent sectors are aligned with said rotor slots; and, an armature winding contained in said armature-winding slots, the number of coils of said armature winding being such that the maximum output voltage of said generator when it is operating under open circuit conditions is at most equal to the nominal voltage.

2. The combination defined in claim 1 wherein all of said teeth separating said unwound slots have a profile such that the tip portion has a peripheral width $d$ which is constant through a height $h$ equal to from $0.3d$ to $1.0d$ and the remainder of the height of said teeth has a rapidly increasing peripheral width.

3. The combination defined in claim 1 wherein said armature-winding coils are mounted in armature winding said slots as close as possible to the said periphery of said stator member in order to reduce the leakage reactance of said armature winding.

4. The combination defined in claim 3, wherein the armature-winding coil carrying slots are keyshaped adjacent to said periphery and the permeance teeth bordering on said armature-winding slots have a peripheral width which is greater than said width $d$, and thin key is mounted in said keyshaped portion for holding the armature-winding coils in said stator member.

5. The combination defined in claim 3 wherein all of said teeth other than the teeth adjacent said peripheral slots containing said armature-winding coils are shaped so that the tip portion has a peripheral width $d$ which is constant through a height $h$ equal to from $0.3d$ to $1.0d$ and which then rapidly increases for the remainder of the total height of said teeth and wherein the teeth bordering on said armature-winding slots have a peripheral width which is greater than said width $d$ of the remaining stator permeance teeth, and which is not constant for said height $h$ but asymmetrical decreases only on the side thereof facing said armature-winding slots.

6. The combination defined in claim 4 wherein the thickness of said key is approximately equal to the height of said teeth.

UNITED STATES PATENT OFFICE
CERTIFICATE OF CORRECTION

Patent No. 3,564,312        Dated February 16th, 1971

Inventor(s) Victor Bunea

It is certified that error appears in the above-identified patent and that said Letters Patent are hereby corrected as shown below:

In the heading of the patent, line 8, change "Oct. 18" to --Oct. 19--. Column 1, line 30, change "this" to --t is--. Column 6, line 1, change "asymmetrical" to --asymmetrically Signed and sealed this 22nd day of June 1971.

(SEAL)
Attest:

EDWARD M. FLETCHER, JR.
Attesting Officer

WILLIAM E. SCHUYLER, JR.
Commissioner of Patents